May 13, 1941.  F. M. SALISBURY  2,242,147
HINGE FITTING
Filed Dec. 30, 1938   3 Sheets-Sheet 1
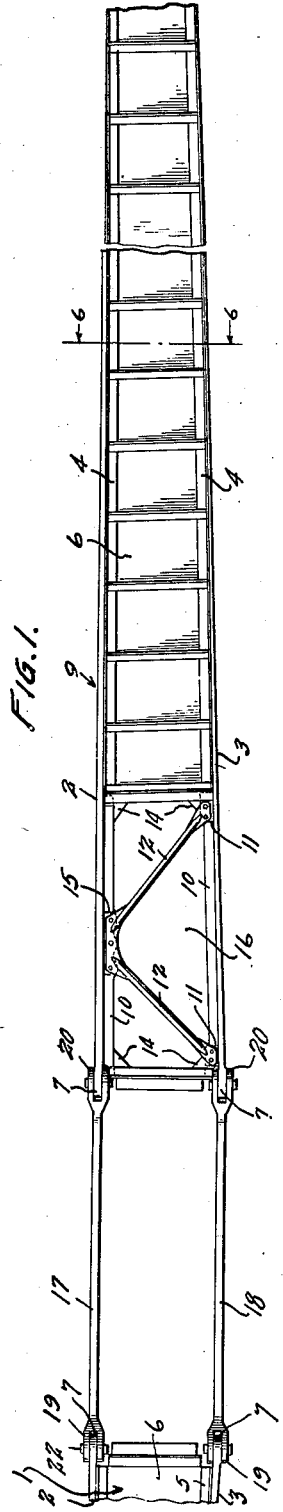
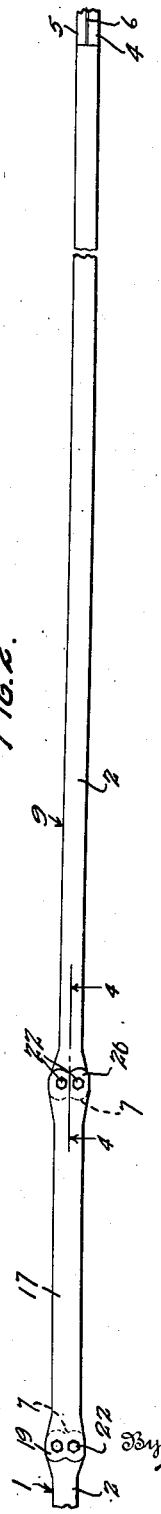
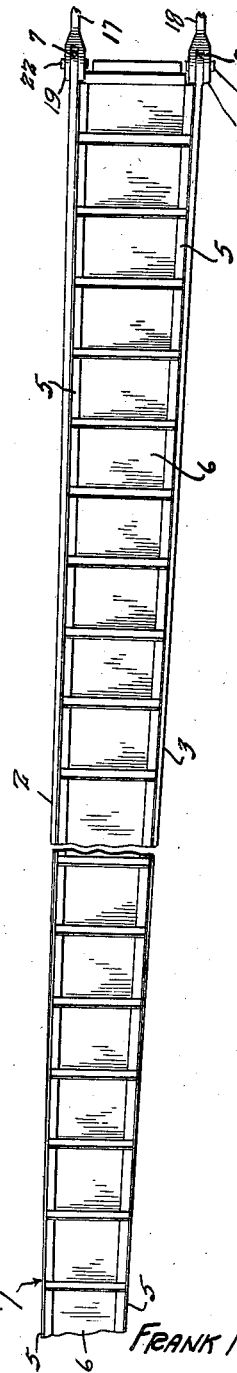
Inventor
FRANK M. SALISBURY
By Semmes, Keegin & Semmes
Attorneys

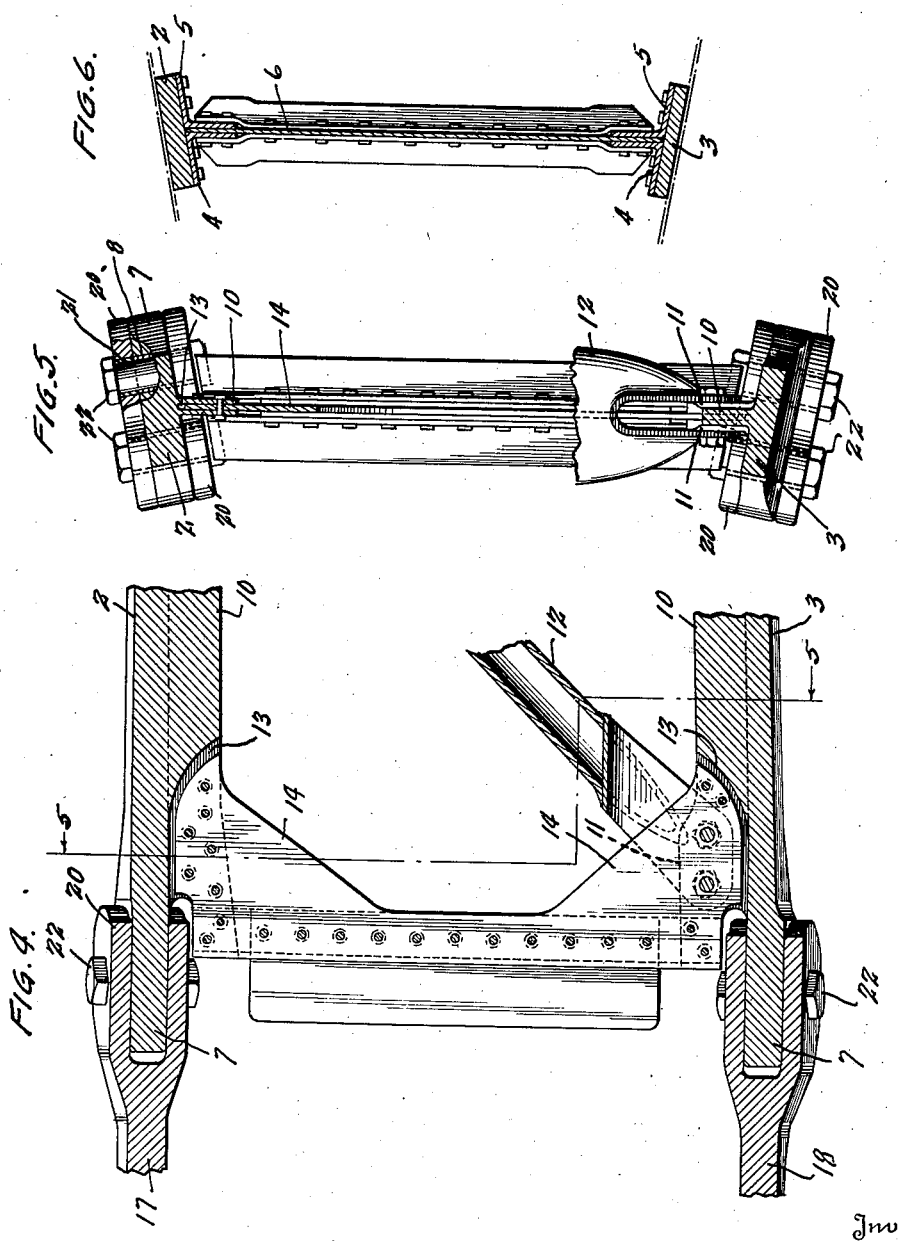

May 13, 1941.　　　F. M. SALISBURY　　　2,242,147
HINGE FITTING
Filed Dec. 30, 1938　　　3 Sheets-Sheet 3
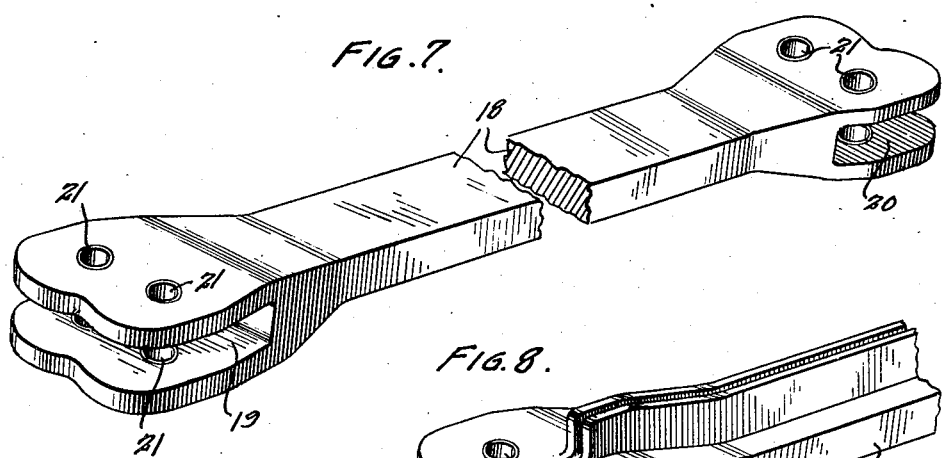
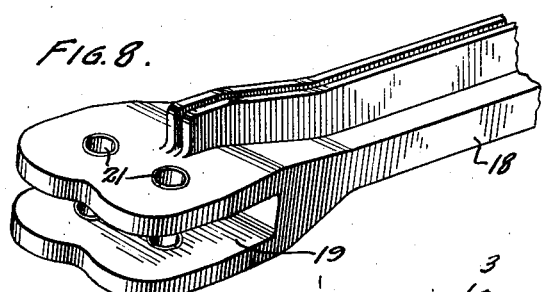
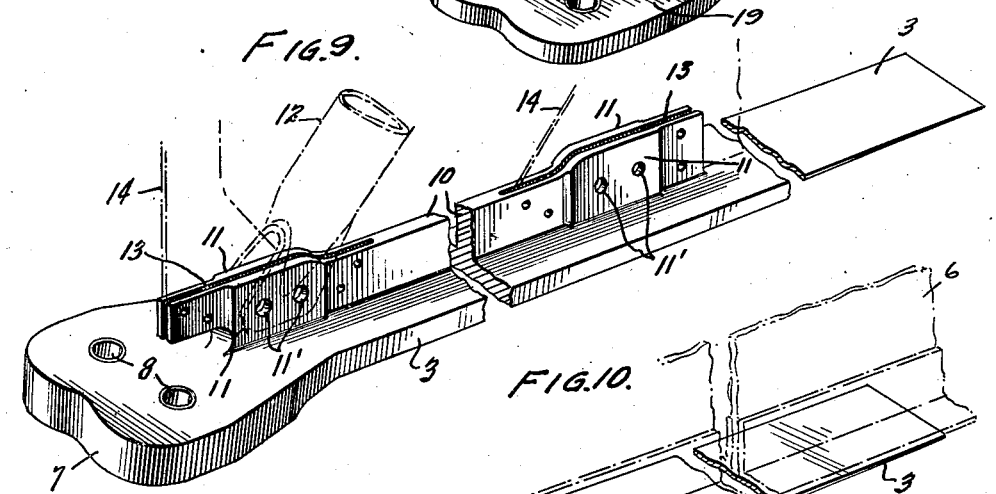
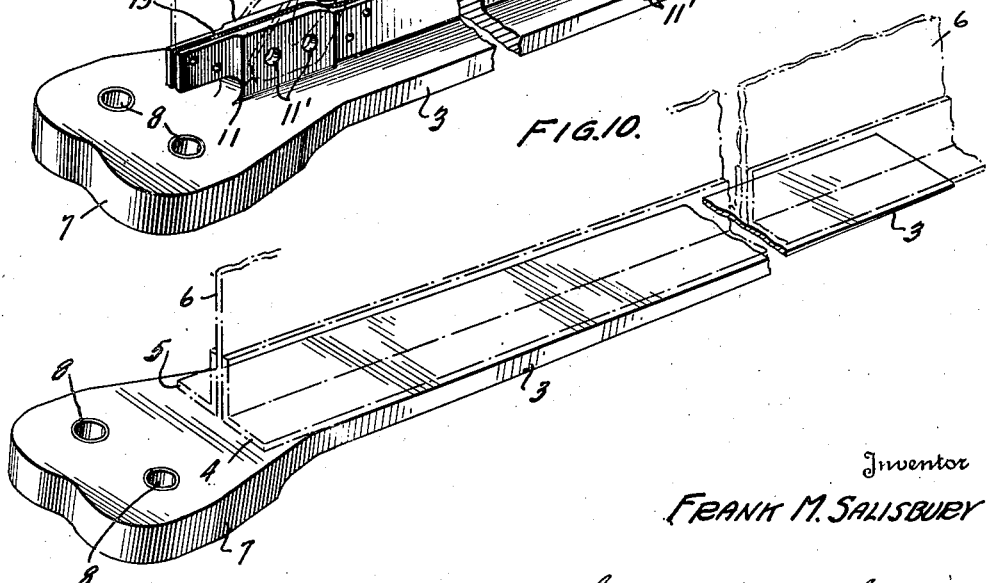
Inventor
FRANK M. SALISBURY
By Semmes, Keegin & Semmes
Attorneys Patented May 13, 1941

2,242,147

UNITED STATES PATENT OFFICE 2,242,147

HINGE FITTING

Frank M. Salisbury, Kenmore, N. Y., assignor to Bell Aircraft Corporation, Buffalo, N. Y., a corporation of New York Application December 30, 1938, Serial No. 248,615

5 Claims. (Cl. 244—117)

My invention relates generally to a wing construction for an airplane, and more especially to a tapered wing beam which is provided with integral hinge fittings.

One of the objects of my invention is to provide a wing beam for wing construction, especially of the cantilever type, which is composed of a pair of reenforcing pieces provided with integrally formed hinge fittings and fabricated with flanges between which are inserted the sheer members of the beam.

Another object of my invention is to provide a reenforcing member for wing beam which is similar to the construction described above but which is provided with integral bosses and slots for the attachment of sheer members of web or truss design.

With these and other objects in view, my invention generally embraces the idea of providing a beam for a cantilever wing which is provided with reenforcing members having constant stress characteristics. These tapered reenforcing pieces are fabricated with flanges between which are attached beam webs. One of the extremities of these reenforcing pieces is forged or machined into a hinge fitting, which thereby forms an integral part of the beam. These beams are designed so that they may be attached to a coacting hinge fitting also formed integral with a carry-through member of the fuselage structure without the necessity of employing additional attaching members, thereby increasing the strength of the wing structure.

A modification of this beam is also provided which is constructed in a manner similar to that described above except that the reenforcing pieces are provided with integral lugs or bosses for the attachment of additional sheer members of truss design. This construction provides an opening in the reenforcing beam through which access to the wing interior is allowed through the beam itself.

In the drawings:

Figure 1 is a partial view in side elevation of a wing beam which is provided with sheer members of both web and truss design, showing the beam attached to carry-through members of the fuselage construction.

Figure 2 is a top plan view of the beam shown in Figure 1.

Figure 3 is a partial view in side elevation of a beam for the wing of an airplane which is provided entirely with a web sheer piece.

Figure 4 is a view taken along the line 4—4 of Figure 2, looking in the direction of the arrows.

Figure 5 is a view taken along the line 5—5 of Figure 4, looking in the direction of the arrows.

Figure 6 is a view taken along the line 6—6 of Figure 1, looking in the direction of the arrows.

Figure 7 is a perspective view of a carry-through member partially broken away.

Figure 8 is a fragmental perspective view of a carry-through provided with attaching flanges.

Figure 9 is a fragmental perspective view of the lower reenforcing member of the beam shown in Figure 1, disclosing the structure of an integrally formed flange in detail.

Figure 10 is a fragmental perspective view of one of the reenforcing members of the beam shown in Figure 3, disclosing the flanged construction which supports the beam webs.

As shown in Figure 3, my invention consists of a wing beam, generally designated by the numeral 1, which is designed to form part of a cantilever wing structure. This reenforcing beam 1 comprises an upper reenforcing strip 2 and a lower reenforcing strip 3 which are tapered on a constant stress basis.

As best shown in Figure 10, the tapered reenforcing piece 3 is fabricated with flanges 4 and 5 between which are inserted sheer members such as the beam webs 6. The upper reenforcing strip 2 is similarly constructed and the web 6 forms the connection between the two members.

One extremity of the lower reenforcing strip 3 is forged or machined into a hinge fitting 7 which is provided with bushed apertures 8. The upper reenforcing piece 2 is similarly constructed.

In Figure 1 is disclosed a wing beam 9 which is a modification of my invention. This beam 9 is provided with the structural parts discussed in relation to the beam 1 shown in Figure 3, and these parts are designated by identical numerals.

In addition to this enumerated construction, however, the lower reenforcing piece 3 of the beam 9 is provided with an integrally formed flange 10, which is thickened into bosses 11 at any point where it is desired to use truss construction in place of webs. This structure is shown in detail in Figure 9.

These bosses are provided with suitable apertures 11' to furnish means of securing trusses such as designated at 12. The flange 10 is also provided with slots 13 in which are mounted web members of any suitable construction such as the gussets 14.

The upper reenforcing piece 2 of the beam 9 is also flanged and provided with slots 13 which are designed to carry web members such as gussets 14 and are provided with integrally formed bosses 15 to which may be attached the upper extremities of the struts 12. This construction forms an opening 16 which provides a means by which access may be attained to the interior of the wing through the beam.

The fuselage portion of the wing construction consists of a pair of carry-throughs 17 and 18 which extend entirely through the fuselage. These carry-throughs are of similar construction, the details of which are best shown in Figure 7.

As best shown in this figure, each carry-through consists of a member 18, each of the extremities of which is bifurcated to form similar hinges 19 and 20. Each bifurcated portion of these hinges are provided with bushed apertures 21.

To attach the reenforcing beam 1 or 9 to the fuselage of the airplane, the hinge members 3 of the upper and lower reenforcing pieces 2 and 3 are fitted between the bifurcated hinges 20 of the carry-throughs 17 and 18. A second reenforcing beam is attached to the opposite side of the fuselage by fitting the hinge members 2 and 3 to the hinge 19 of the carry-throughs 17 and 18. The hinge members 3 are connected to the bifurcated hinges 20 by any suitable means such as the bolts 22.

From the above description it is apparent that I have provided a reenforcing beam for a wing construction of cantilever type which is provided with means formed integrally with the beam to attach the beam to the fuselage construction. By means of this design, no bolts or additional attaching means are required to transfer the loads in the chord members of the beam to the hinge fittings. This increases the strength of the beam in its point of attachment, thereby strengthening the entire wing structure. The possibility of bolts or other attaching means being sheared off is also eliminated.

While for purposes of illustration I have described two modifications of my invention, it is obvious that various changes could be made in the manner of fabrication of the parts of the beam without departing from the concept of my invention.

I, therefore, desire that my invention be only limited by the prior art and the scope of the appended claims.

I claim:

1. In a wing construction, a wing beam composed of two reenforcing members, a hinge fitting integrally formed on one of the extremities of each of the reenforcing members, bosses on each of the reenforcing members adjacent the said hinge fittings, slotted flanges on each of the reenforcing members and extending from the bosses to the extremities of the members opposite the hinge fittings, trusses and web members adapted to connect the two reenforcing members, said truss members being mounted on the said bosses and the extremities of the said web members being mounted in the slots of the said flanges.

2. In a wing construction, a wing beam composed of two reenforcing members, a hinge fitting integrally formed on one of the extremities of each of the reenforcing members, bosses integrally formed with each of the reenforcing members adjacent the said hinge fittings, slotted flanges integrally formed with each of the reenforcing members and extending from the bosses to the extremities of the members opposite the hinge fittings, struts and gussets adapted to connect the two reenforcing members, said strut members being mounted on the said bosses and the extremities of the said gussets being mounted in the slots of the said flanges.

3. In a wing construction, a wing beam composed of upper and lower reenforcing members, a hinge fitting integrally formed on one of the extremities of each of the reenforcing members, said lower reenforcing member tapering from the hinge outwardly towards the upper reenforcing member on a constant stress basis, slotted flanges integrally formed with each of the reenforcing members, and web members adapted to connect the two reenforcing members, said web members being mounted in the slots of the said flanges.

4. In a wing construction, a wing beam composed of upper and lower reenforcing members, a hinge fitting integrally formed on one of the extremities of each of the reenforcing members, said lower reenforcing member tapering from the hinge outwardly towards the upper reenforcing member on a constant stress basis, slotted flanges integrally formed with each of the reenforcing members and extending from the hinge to the extremities of the members opposite the hinge fittings, and gussets adapted to connect the two reenforcing members, said gussets being mounted in the slots of the said flanges.

5. In a wing construction, a wing beam composed of an upper and a lower reenforcing member, a hinge fitting integrally formed on the extremities of each of the reenforcing members, said lower reenforcing member tapering from the hinge outwardly towards the upper reenforcing member on a constant stress basis, a flange integrally formed with each of the reenforcing members adjacent the said hinge fittings, portions of each flange being thickened to form bosses, slotted flanges integrally formed with each of the reenforcing members and extending from the said bosses to the extremities of the said members opposite the hinge fittings, struts and web members adapted to connect the two reenforcing members, said strut members being mounted on the said bosses and the extremities of the said web members being mounted in the slots of the said flanges.

FRANK M. SALISBURY.